US010038570B2

(12) United States Patent
Maise et al.

(10) Patent No.: US 10,038,570 B2
(45) Date of Patent: Jul. 31, 2018

(54) CONTROL DEVICE FOR CONNECTING A CAN BUS TO A RADIO NETWORK, AND MOTOR VEHICLE HAVING SUCH A CONTROL DEVICE

(71) Applicant: Dr. Ing. h.c. F. Porsche Aktiengesellschaft, Stuttgart (DE)

(72) Inventors: Timo Maise, Ludwigsburg (DE); Paul Behrendt, Leonberg (DE); Kai Schneider, Neuffen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 67 days.

(21) Appl. No.: 15/085,364

(22) Filed: Mar. 30, 2016

(65) Prior Publication Data
US 2016/0294725 A1 Oct. 6, 2016

(30) Foreign Application Priority Data
Apr. 2, 2015 (DE) .................... 10 2015 105 134

(51) Int. Cl.
*H04L 12/40* (2006.01)
*H04L 29/08* (2006.01)
(52) U.S. Cl.
CPC ........ *H04L 12/40202* (2013.01); *H04L 67/12* (2013.01)
(58) Field of Classification Search
CPC .................... H04L 12/40202; H04L 67/12
See application file for complete search history.

(56) References Cited

U.S. PATENT DOCUMENTS 5,574,848 A * 11/1996 Thomson .......... H04L 12/40013
714/2
6,587,968 B1 * 7/2003 Leyva ............... H04L 12/40032
714/43
(Continued)

FOREIGN PATENT DOCUMENTS

DE 4126850 2/1993
DE 102011051758 1/2013
(Continued)

OTHER PUBLICATIONS

German Search Report for German Application No. 102015105134.6 dated Feb. 6, 2016, including partial English language translation.

*Primary Examiner* — Curtis A Alia
(74) *Attorney, Agent, or Firm* — RatnerPrestia

(57) ABSTRACT

A control device and corresponding motor vehicle for connecting a CAN bus to a radio network, having the following features: the control device includes a wireless controller, a microcontroller, a programmable logic module and a CAN transceiver; the microcontroller is connected, on the one hand, to the wireless controller and, on the other hand, to the logic module; the CAN transceiver is connected, on the one hand, to the logic module and, on the other hand, to the CAN bus; a data stream to the microcontroller corresponds to a data stream from the CAN transceiver; and the logic module is configured in such a manner that it monitors a data stream from the microcontroller which is addressed to the CAN transceiver and, on the basis of a data frame contained in the data stream from the microcontroller, suppresses at least this data frame.

10 Claims, 5 Drawing Sheets

(56) References Cited

U.S. PATENT DOCUMENTS

| | | | |
|---|---|---|---|
| 2002/0110146 A1* | 8/2002 | Thayer | G07C 5/008 |
| | | | 370/465 |
| 2006/0162986 A1 | 7/2006 | Disser | |
| 2010/0174439 A1 | 7/2010 | Petricoin | |
| 2010/0306457 A1 | 12/2010 | Wilson | |
| 2013/0134730 A1 | 5/2013 | Ricci | |
| 2013/0145482 A1* | 6/2013 | Ricci | G06F 9/54 |
| | | | 726/28 |
| 2013/0227648 A1 | 8/2013 | Ricci | |
| 2015/0089236 A1 | 3/2015 | Han | |
| 2015/0172306 A1 | 6/2015 | Kim | |
| 2016/0294578 A1* | 10/2016 | Maise | H04L 12/4011 |
| 2016/0294724 A1* | 10/2016 | Maise | H04L 47/801 |
| 2016/0294725 A1* | 10/2016 | Maise | H04L 12/40202 |
| 2016/0342531 A1* | 11/2016 | Sharma | G06F 12/1408 |
| 2017/0093908 A1* | 3/2017 | Elend | H04L 1/0045 |
| 2017/0167088 A1* | 6/2017 | Walker | G01M 17/04 |
| 2017/0180152 A1* | 6/2017 | Cink | H04L 12/40013 |

FOREIGN PATENT DOCUMENTS

| | | |
|---|---|---|
| DE | 112012004770 | 8/2014 |
| KR | 101472896 | 12/2014 |

\* cited by examiner

CONTROL DEVICE FOR CONNECTING A CAN BUS TO A RADIO NETWORK, AND MOTOR VEHICLE HAVING SUCH A CONTROL DEVICE

CROSS-REFERENCE TO RELATED APPLICATION

This application claims priority to German Patent Application No. DE 10 2015 105 134.6, filed Apr. 2, 2015, which is incorporated by reference herein in its entirety.

FIELD OF THE INVENTION

The present invention relates to a control device for connecting a CAN bus to a radio network. The present invention also relates to a corresponding motor vehicle.

BACKGROUND OF THE INVENTION

A widespread vehicle area network (VAN) which is internationally standardized according to ISO 11898 is familiar to a person skilled in the art as a controller area network CAN. Wireless interfaces for such a vehicle area network are also known. However, an unauthorized third party can also access the vehicle area network via such an interface and can thus interfere with or paralyze the vehicle area network. It is therefore sometimes proposed to prevent write access (transmit, Tx) to the vehicle area network via the interface. However, no diagnoses or network management applications can be executed in this case via the interface.

DE 10 2011 051 758 A1, which is incorporated by reference herein, discloses a CAN bus adapter for connection to the CAN bus of a motor vehicle. The CAN bus adapter has at least one first interface for connection to the CAN bus of a motor vehicle and at least one second interface for wireless or wired connection to a computer or a device of that kind. The CAN bus adapter is distinguished by the fact that at least one buffer is provided and is designed to store the CAN bus data received from the first interface according to the first-in-first-out principle if necessary.

US 2010/0306457 A1, which is incorporated by reference herein, relates to a microcontroller having a random access memory and a CAN controller which has a control unit which receives an assembled CAN message, the control unit being set up to generate a buffer descriptor table entry using the assembled CAN message and to store this buffer descriptor table entry in the random access memory. The buffer descriptor table entry comprises at least one message identifier and useful data from the CAN message and information relating to a subsequent buffer descriptor table entry.

DE 41 26 850 A1, which is incorporated by reference herein, proposes a circuit arrangement for adapting a data bus controller module to a symmetrical bus line, in particular according to the CAN bus system, in order to add a reactance, which has been inserted into the transmission signal path from the controller module to the bus line and has a low shunt capacitance and a controllably variable inductance value, and a control circuit for temporally changing the inductance acting on the transmission signal current on the basis of signal edges of the transmission signal.

US 2013/0227648 A1, which is incorporated by reference herein, and US 2010/0174439 A1, which is incorporated by reference herein, discuss similar apparatuses.

SUMMARY OF THE INVENTION

Described herein is a control device for connecting a CAN bus to a radio network and a corresponding motor vehicle.

If an unauthorized third party transmits unauthorized messages via such an interface, they are blocked according to the operating principle of a receive filter. In contrast, if the third party transmits authorized messages, they are transmitted on the CAN bus. Diagnoses, network management functions or component protection, for example, should be borne in mind in this case.

The proposed CAN Tx filter can therefore be used to implement diagnosis, network management and component protection for a vehicle control device with a wireless interface without thereby making it possible to manipulate the vehicle electronics by means of attacks via the wireless interface.

The logic module can therefore have a complex programmable logic circuit (complex programmable logic device, CPLD) which is fed by the data stream from the microcontroller. The homogeneous structure of such circuits makes it possible to exactly determine the run times of the processed data frames in the case of a large number of inputs and logic blocks. When using EECMOS (electronically erasable complementary metal oxide semiconductor), the program is additionally retained after configuration and need not be reloaded for every start. As a result of the simpler structure and the small size of circuits of the generic type, a corresponding embodiment of the invention is distinguished by a low power consumption.

The use of a field-programmable gate array (FPGA) likewise comes into consideration, the finely meshed array of logic blocks and flip-flops of which enables particularly flexible configuration. A defined maximum run time of the data frames to be processed can also be achieved in this case by means of design methods known to a person skilled in the art.

In one preferred configuration, the CAN transceiver used has a control input in order to either release the data stream to the CAN transceiver by means of a release signal for the CAN bus or to block it by means of a blocking signal for the CAN bus. In this case, the logic module essential to the invention should be configured in such a manner that it provides the blocking signal on the basis of the data frame. The CAN transceiver is externally changed, for example, to an operating state, in which the CAN transceiver still receives data frames via the CAN bus (listen-only mode), by a logic device, a microcontroller or the like by means of the blocking signal. If this mode is activated, the transmitter in the CAN transceiver is deactivated. Messages on the CAN bus can therefore be read; transmission is prevented. The embodiment described has the advantage of not causing any delay of the signal propagation time.

An advantageous choice for a suitable transceiver is the TJA1041 model from NXP Semiconductors. A CAN transceiver of this type provides the control device with a particularly high transmission speed of up to 1 Mbit/s with pronounced electromagnetic compatibility and a low energy consumption.

In an alternative embodiment, the CAN read receiver can also be completely disconnected via a pin or changed to a stand-by operating state (stand-by mode). In this case, it is not possible to forward the messages to be transmitted and the received messages.

BRIEF DESCRIPTION OF THE DRAWINGS

One exemplary embodiment of the invention is illustrated in the drawings and is described in more detail below.

DETAILED DESCRIPTION OF THE INVENTION

Figure 1:
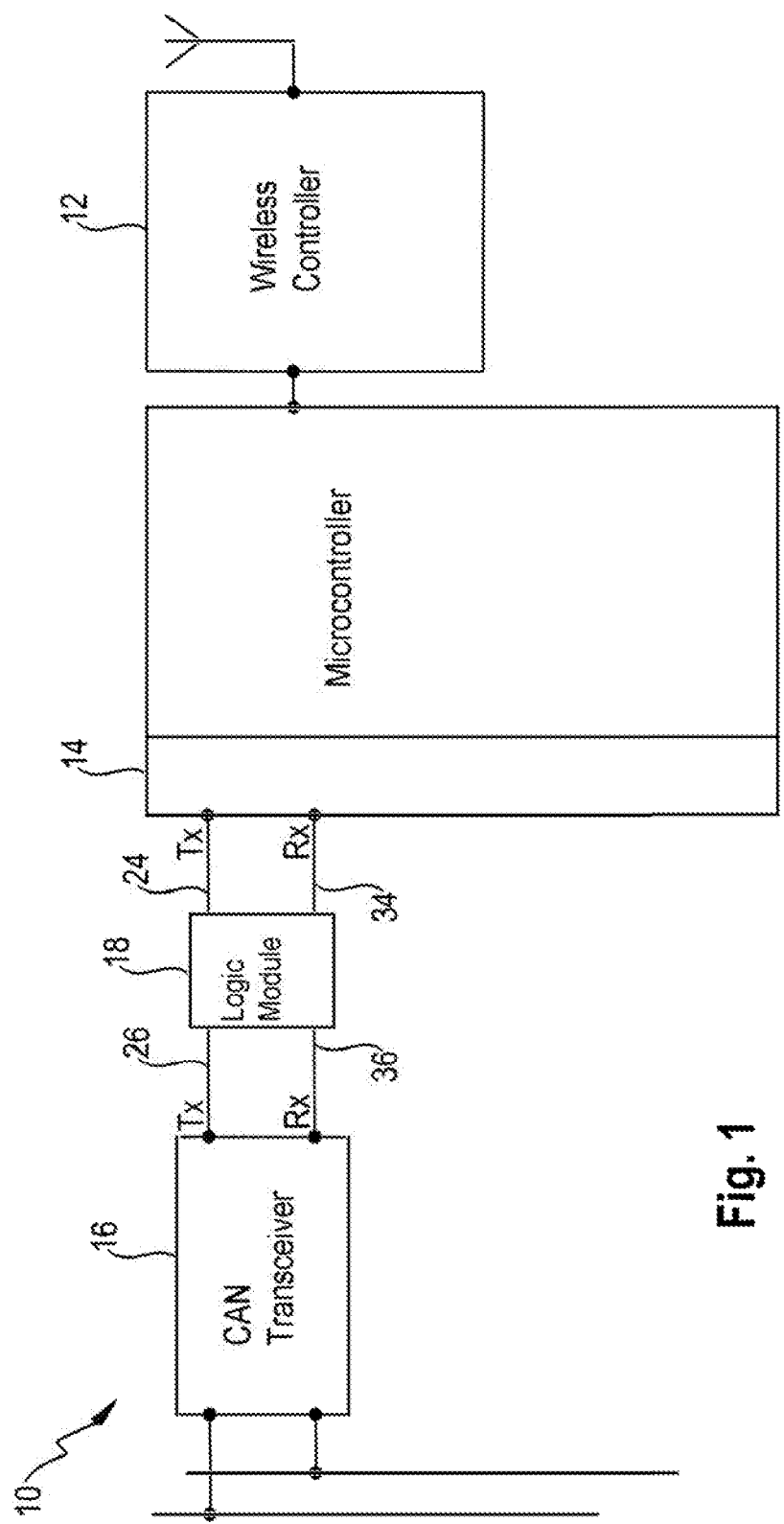
FIG. 1 shows the block diagram of a control device according to aspects of the invention.

FIG. 1 illustrates the fundamental structure of a vehicle control device 10 having a wireless controller 12, a microcontroller 14, a programmable logic module 18 and a CAN transceiver 16. Said microcontroller 14 is connected, on the one hand, to the wireless controller 12 and, on the other hand, to the logic module 18, and the CAN transceiver 16 is connected, on the one hand, to the logic module 18 and, on the other hand, to the CAN bus.

In this case, the logic module 18 can be incorporated in the transmission (Tx) and reception (receive, Rx) of data frames in different configuration and connection variants. The common feature of these approaches is that the data stream 34 to the microcontroller 14 always corresponds to the data stream 36 from the CAN transceiver 16, whereas data frames in the data stream 24 from the microcontroller 14 are occasionally forwarded to the CAN transceiver 16 or are suppressed. The programmable logic module 18 compares the received IDs with a list of authorized IDs and possibly terminates or interrupts transmission. A plurality of approaches are possible in this case.

Figure 2:
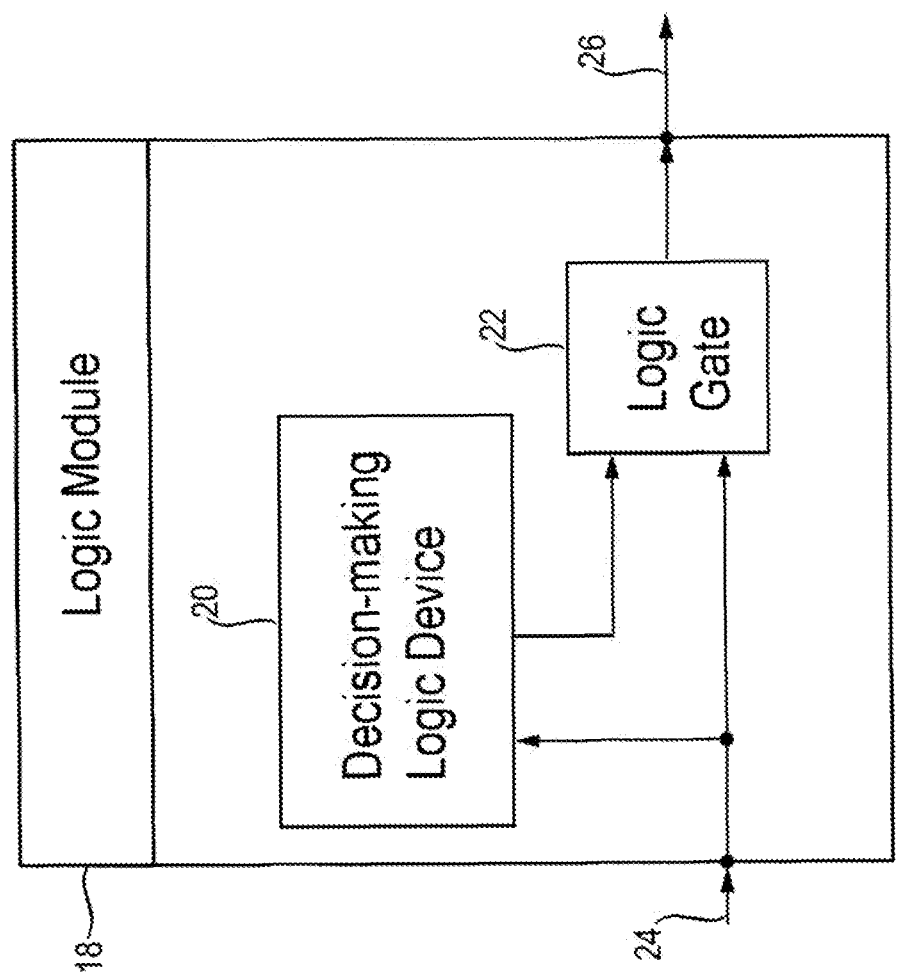
FIG. 2 shows the block diagram of a logic module according to a first embodiment of the invention.

In the embodiment of the invention shown in FIG. 2, the data line between the microcontroller 14 and the CAN transceiver 16 is interrupted and is passed through the programmable logic module 18. The IDs are filtered by a decision-making logic device 20 and a logic gate 22. The output of the logic gate 22 is connected to the output of the logic module and therefore to the input of the CAN transceiver 16.

The logic device 20 permanently reads the levels on the Tx line and synchronizes itself with the CAN frame. The task of the logic gate 22 is to generate a recessive level on the CAN line 26 to the CAN transceiver 16 if an incorrect ID has been detected. The data can be overwritten by other CAN users.

If the recessive state is logic 1, an OR operation is used. If the recessive state is logic 0, an AND operation is used. Both are standard modules/components in a programmable logic module 18.

The data stream 24 from the microcontroller 14 is monitored at any time. The microcontroller 14 can therefore first transmit each bit of the ID on the CAN bus. If the incorrect ID is transmitted, the logic module 18 interrupts transmission; in this case, a maximum of one incorrect bit is transmitted until the data stream 26 to the CAN transceiver 16 is blocked.

Figure 3:
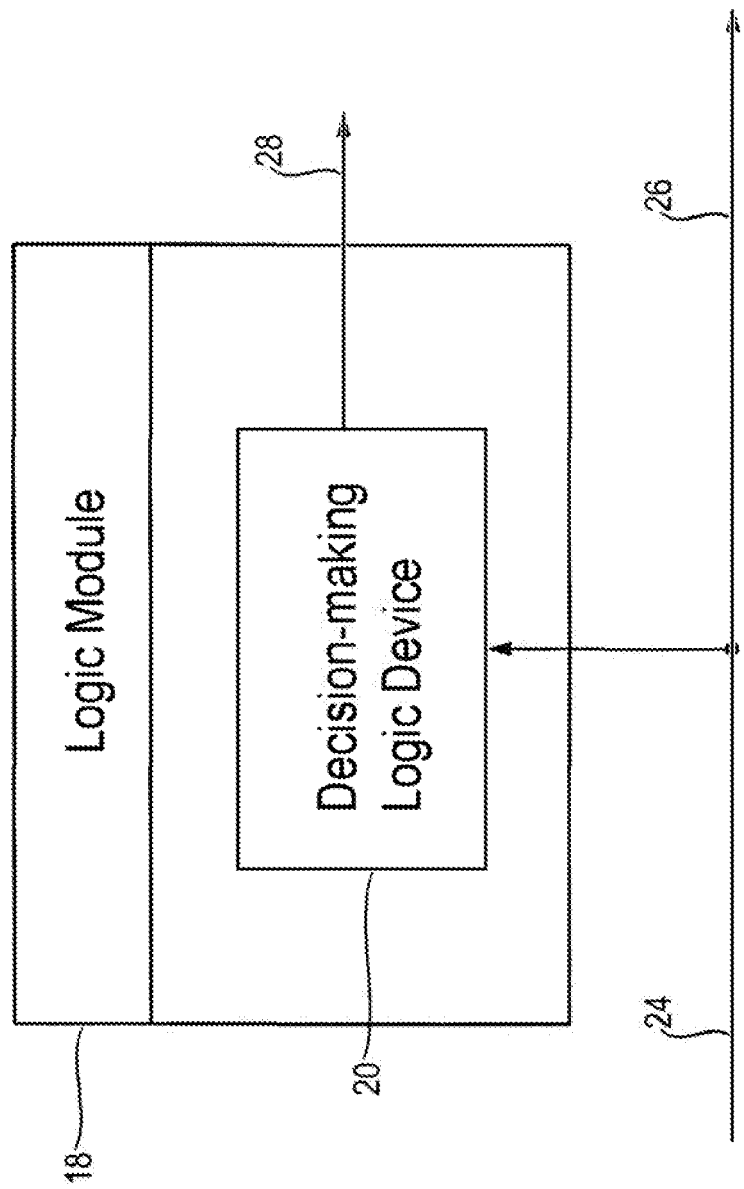
FIG. 3 shows the block diagram of a logic module according to a second embodiment of the invention.

In the variant according to FIG. 3, the data stream 24 from the microcontroller 14 is forwarded without change to the CAN transceiver 16; however, the logic module 18 continuously reads each bit which is transmitted. In a similar manner to the embodiment in FIG. 2, the correctness of the ID is checked. If an incorrect ID is detected, the logic module 18 disconnects the CAN transceiver 16 or changes it to a passive state. Some CAN transceivers 16 have an input which can be used to change them to an operating state in which the CAN transceiver 16 still receives data frames via the CAN bus. Other models in turn have a pin which can be used to entirely disconnect the CAN transceiver 16.

Figure 4:
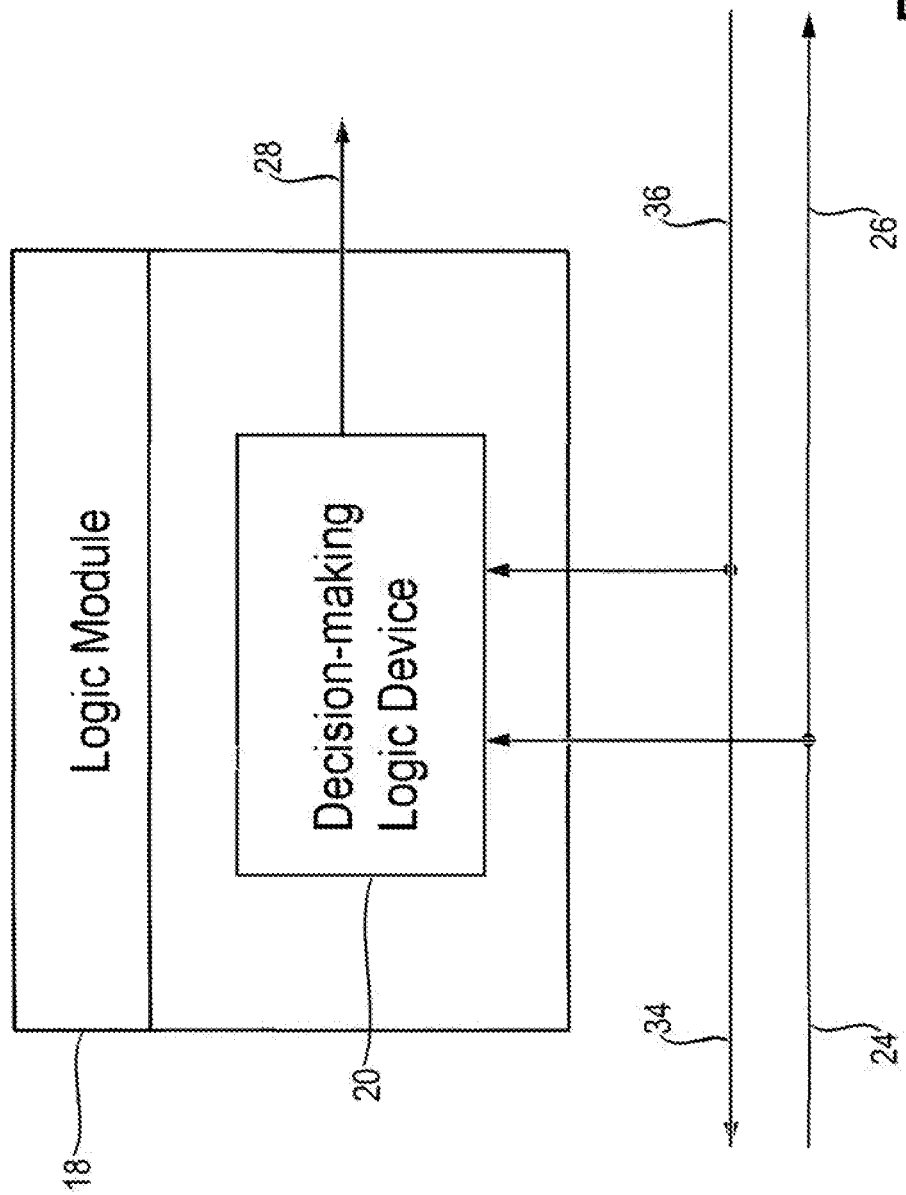
FIG. 4 shows the block diagram of a logic module according to a third embodiment of the invention.
Figure 5:
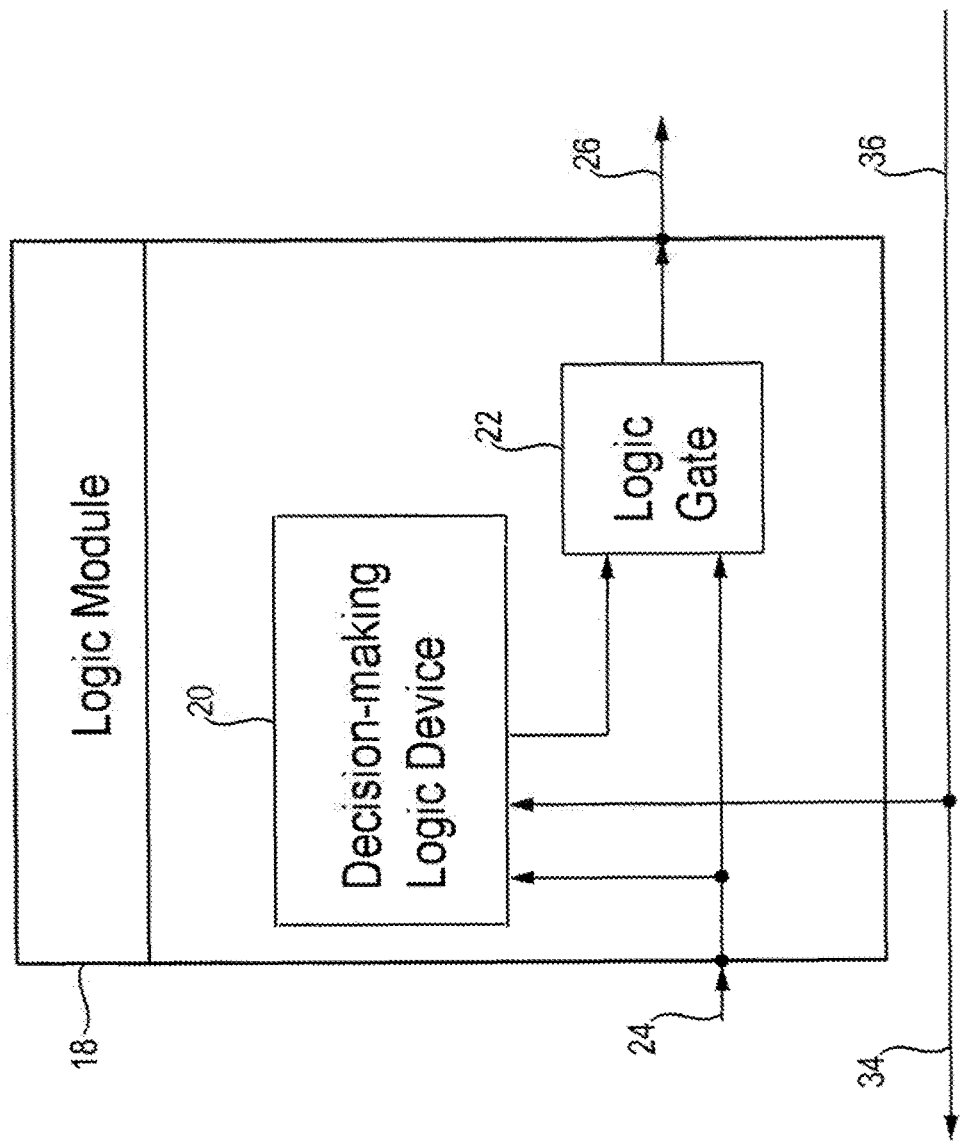
FIG. 5 shows the block diagram of a logic module according to a fourth embodiment of the invention.

FIGS. 4 and 5 show expansion possibilities for the previously presented concepts. In this case, in addition to the Tx data stream 24 from the microcontroller 14 which is addressed to the CAN transceiver 16, the Rx data stream 36 from the CAN transceiver 16 is also monitored by the programmable logic module 18. The transmission of unauthorized messages by the CAN transceiver 16 can be prevented as described above with respect to FIGS. 2 and 3. In contrast to the above embodiments, the forwarding of messages is prevented. The internal logic device 20 for detecting the ID has been expanded such that the IDs of the received messages are also checked. Transmission is enabled for the microcontroller 14 only if a valid message is read. A diagnostic request is mentioned as an example. If such a message is detected in the data stream 36 from the CAN transceiver 16, the programmable logic module 18 allows messages to be transmitted. After a timeout, an incorrect ID or other conditions, this possibility is prevented again.

The advantage of this approach is its additional security. In contrast to the configurations in FIG. 2 and FIG. 3, the microcontroller 14 is not able to continuously transmit messages on the CAN bus here. The programmable logic module 18 must first receive a defined message before it enables transmission by the microcontroller 14 for a defined period.

What is claimed is:

1. A control device for connecting a controller area network (CAN) bus to a radio network, said control device comprising:
   a wireless controller, a microcontroller, a programmable logic circuit and a CAN transceiver,
   the microcontroller is connected between the wireless controller and the programmable logic circuit,
   the CAN transceiver is connected between the programmable logic circuit and to the CAN bus,
   a first data stream to the microcontroller for wireless transmission corresponds to a second data stream from the CAN transceiver, and
   the programmable logic circuit is configured to monitor a third data stream from the microcontroller which is addressed to the CAN transceiver, compare an ID of a data frame contained in the third data stream to a list of authorized IDs, and, on the basis of the ID in said data frame contained in the third data stream from the microcontroller not being on the list of authorized IDs, the programmable logic circuit suppresses said data frame.

2. The control device as claimed in claim 1, wherein the programmable logic circuit includes a decision-making logic circuit which receives the first data stream from the microcontroller.

3. The control device as claimed in claim 1,
   wherein the CAN transceiver has a control input in order to either release a fourth data stream to the CAN transceiver by way of a release signal for the CAN bus or to block the release signal by way of a blocking signal for the CAN bus, and
   wherein the programmable logic circuit is configured to provide the blocking signal on the basis of the data frame.

4. The control device as claimed in claim 3, wherein the programmable logic circuit is configured to monitor the second data stream from the CAN transceiver and temporarily provide the release signal on the basis of a data frame contained in the second data stream from the CAN transceiver.

5. The control device as claimed in claim 4, wherein the programmable logic circuit is configured to provide the release signal when the data frame comprises a diagnostic request.

6. The control device as claimed in claim 3, wherein the CAN transceiver is configured to change to an operating state in which the CAN transceiver still receives data frames via the CAN bus in response to the blocking signal.

7. The control device as claimed in claim 3, wherein the CAN transceiver is configured to change to a stand-by operating state in response to the blocking signal.

8. The control device as claimed in claim 3, wherein the CAN transceiver is configured to disconnect in response to the blocking signal.

9. The control device as claimed in claim 3, wherein the programmable logic circuit has a logic gate in order to either release the fourth data stream to the CAN transceiver by way of a dominant signal level or to block the fourth data stream by way of a recessive signal level, and the programmable logic circuit is configured to set the recessive signal level on the basis of the data frame.

10. A motor vehicle comprising:
a controller area network (CAN) bus; and
a control device coupled to the CAN bus, the control device comprising;
    a wireless controller, a microcontroller, a programmable logic circuit and a CAN transceiver,
    the microcontroller is connected between the wireless controller and the programmable logic circuit,
    the CAN transceiver is connected between the programmable logic circuit and to the CAN bus,
    a first data stream to the microcontroller for wireless transmission corresponds to a second data stream from the CAN transceiver, and
the programmable logic circuit is configured to monitor a third data stream from the microcontroller which is addressed to the CAN transceiver, compare an ID of a data frame contained in the third data stream to a list of authorized IDsm, and, on the basis of said data frame contained in the third data stream from the microcontroller not being on the list of authorized IDs, the programmable logic circuit suppresses said data frame.

* * * * *